(12) United States Patent
Melanson

(10) Patent No.: US 8,578,578 B2
(45) Date of Patent: Nov. 12, 2013

(54) PIPE ADJUSTMENT TOOL

(76) Inventor: Jerry Melanson, High River (CA)

( * ) Notice: Subject to any disclaimer, the term of this patent is extended or adjusted under 35 U.S.C. 154(b) by 369 days.

(21) Appl. No.: 12/616,803

(22) Filed: Nov. 12, 2009

(65) Prior Publication Data
US 2011/0107574 A1 May 12, 2011

(51) Int. Cl.
B23P 11/00 (2006.01)
B23P 19/04 (2006.01)
B25B 27/14 (2006.01)
B25B 1/20 (2006.01)

(52) U.S. Cl.
USPC ............. 29/272; 269/43; 29/243.55; 29/255; 29/253

(58) Field of Classification Search
USPC ......... 29/272, 243.55, 255, 253; 269/43, 131, 269/132; 228/49.3, 44.5, 212; 408/92
See application file for complete search history.

(56) References Cited

U.S. PATENT DOCUMENTS

| | | | |
|---|---|---|---|
| 2,833,051 A * | 5/1958 | Cunningham ................ 269/132 |
| 3,704,503 A | 12/1972 | Haywood | |
| 3,797,094 A | 3/1974 | Combs | |
| 3,898,714 A | 8/1975 | McFadden | |
| 4,011,979 A | 3/1977 | Hagen | |
| 4,477,937 A * | 10/1984 | Costello ........................ 81/129 |
| 4,586,647 A | 5/1986 | Dearman | |
| 4,623,085 A * | 11/1986 | Dearman ..................... 228/49.3 |
| 4,726,575 A * | 2/1988 | Dearman ........................ 269/43 |
| 4,750,662 A | 6/1988 | Kagimoto | |
| 4,934,673 A | 6/1990 | Bahler | |
| 5,165,360 A | 11/1992 | Moody | |
| 5,865,430 A | 2/1999 | Conover et al. | |
| 6,092,271 A | 7/2000 | Stojkovic et al. | |
| 6,264,406 B1 * | 7/2001 | Bowles et al. ................. 269/131 |
| 6,378,187 B1 | 4/2002 | Walker | |
| 6,382,496 B1 | 5/2002 | Harger | |
| 6,641,124 B2 * | 11/2003 | Melanson ........................ 269/43 |
| 7,384,209 B2 * | 6/2008 | Muders et al. ................ 403/115 |

* cited by examiner

Primary Examiner — Monica Carter
Assistant Examiner — Seahee Yoon
(74) Attorney, Agent, or Firm — Maxby Law Offices; Stephen Lewellyn

(57) ABSTRACT

A pipe adjustment tool for use in aligning the confronting ends of a pair of pipe sections having a joint therebetween provides a frame having a seating surface for acting against an exterior surface of a pipe section. The seating surface being disposed at a 45-degree angle relative to a threaded bore of the frame. A flexible clamping member is attached to the frame at one end and is a of length to substantially encircle the pipe section. The opposite end of the clamping member is received and secured by a retainer. The retainer and the frame are connected together by an articulated joint formed by a ball-shaped end of a threaded bolt extending through frame and a ball-shaped socket in the retainer. The retainer and frame are movably relative to each other by operating the threaded bolt to provide tension in the clamping member about the pipe section.

4 Claims, 7 Drawing Sheets

PIPE ADJUSTMENT TOOL

FIELD OF THE INVENTION

The present invention relates generally to a device for use in aligning the confronting ends of a pair of pipe sections in joining the confronting ends of the pair of pipe sections.

BACKGROUND OF THE INVENTION

In welding the confronting ends of a pair of pipe members, it is desirable to axially align the pipe members prior to accomplishing the welding in order to ensure a good quality, even weld. Before welding the two pipe members, the confronting ends, of the pipe members are therefore preferably positioned so as to minimize variations in wall thickness, configuration and other irregularities. This can best be accomplished by bringing a first pipe member in coaxial position with a second pipe member and providing support for the confronting ends of both pipes and a means to keep the two pipe members in a fixed position relative to each other. It is also frequently desirable to adjust the shape of at least one of the two pipe members by applying force to minimize difference in configuration between the two ends of the confronting pipe members.

Various devices for use in aligning the confronting ends of a pair of pipe members are known to the prior art. The devices disclosed in these patents typically include little adaptability for pipes of varying diameters. In addition they generally include and require many individual parts, resulting in a complicated assembly and disassembly process and consequently in costly time losses. Further the known devices are heavy and large making it difficult to transport these devices. Therefore, there is a need in the art for an improved device which permits the alignment of the confronting ends of a pair of pipe members

SUMMARY OF THE INVENTION

The present invention provides a pipe adjustment tool of an improved construction and operation for use in the alignment of confronting ends of a pair of pipe sections. In general, in one aspect, the pipe adjustment tool includes a flexible chain clampingly positioned about a pipe section. A frame having a threaded through bore and a seating surface seated against an exterior surface of the pipe section. The seating surface being disposed at a 45-degree angle relative to a longitudinal axis of the threaded bore. A first end of the flexible chain is engaged with the frame. A retainer has an aperture through which a second end of the flexible chain is threaded and is secured against being withdrawn from the aperture. A threaded bolt is threadingly received in the threaded bore and has a first end engaged with the locking block for relative rotation therewith in drawing the frame and the locking block together, thereby tightening the flexible chain about the pipe section.

The invention further provides a magnetic device for aligning confronting ends of a first and a second pipe member, the device including an elongated member containing a magnetic material for attachment to a first pipe member, the elongated member projecting laterally relative to the pipe members and comprising an adjustable force applying means to radially apply force to said second pipe member.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
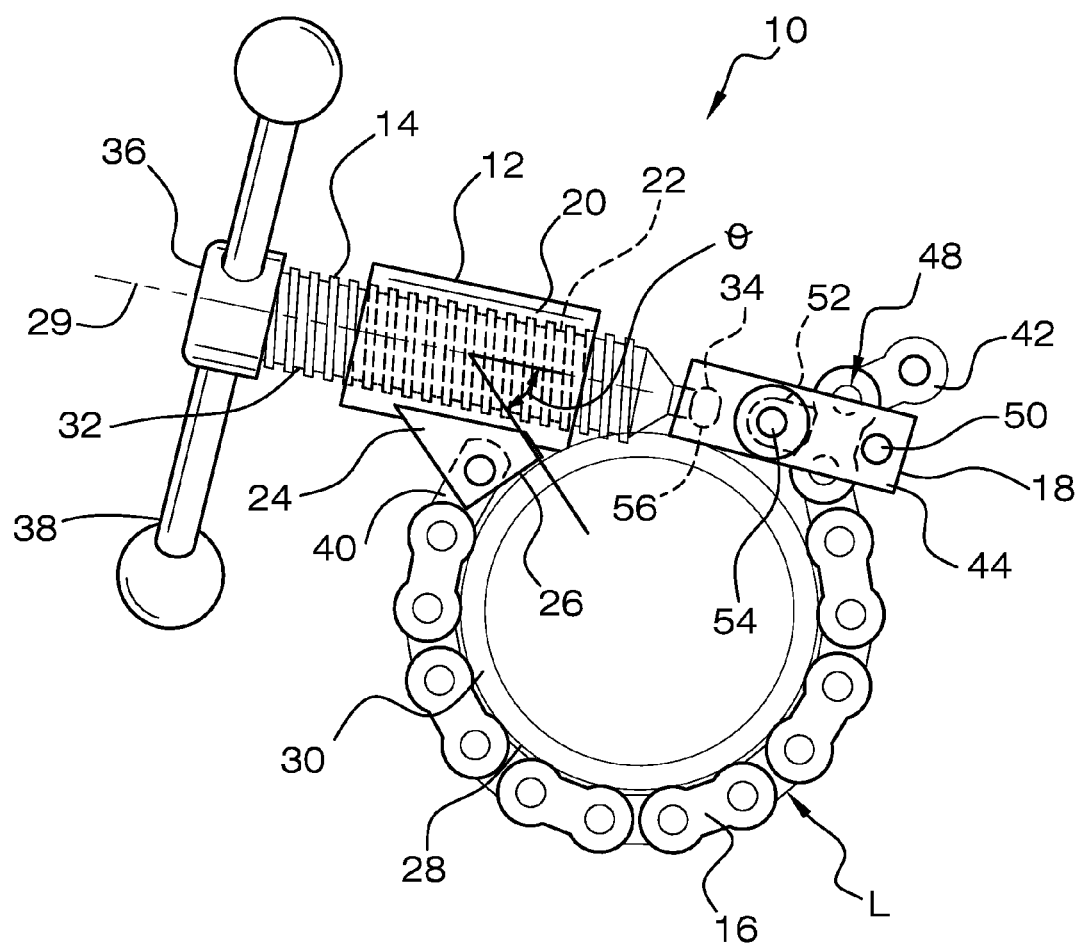
FIG. 1 is an elevation end view of a pipe section having a pipe adjustment tool constructed in accordance with the principles of the invention attached to the pipe section.
Figure 2:
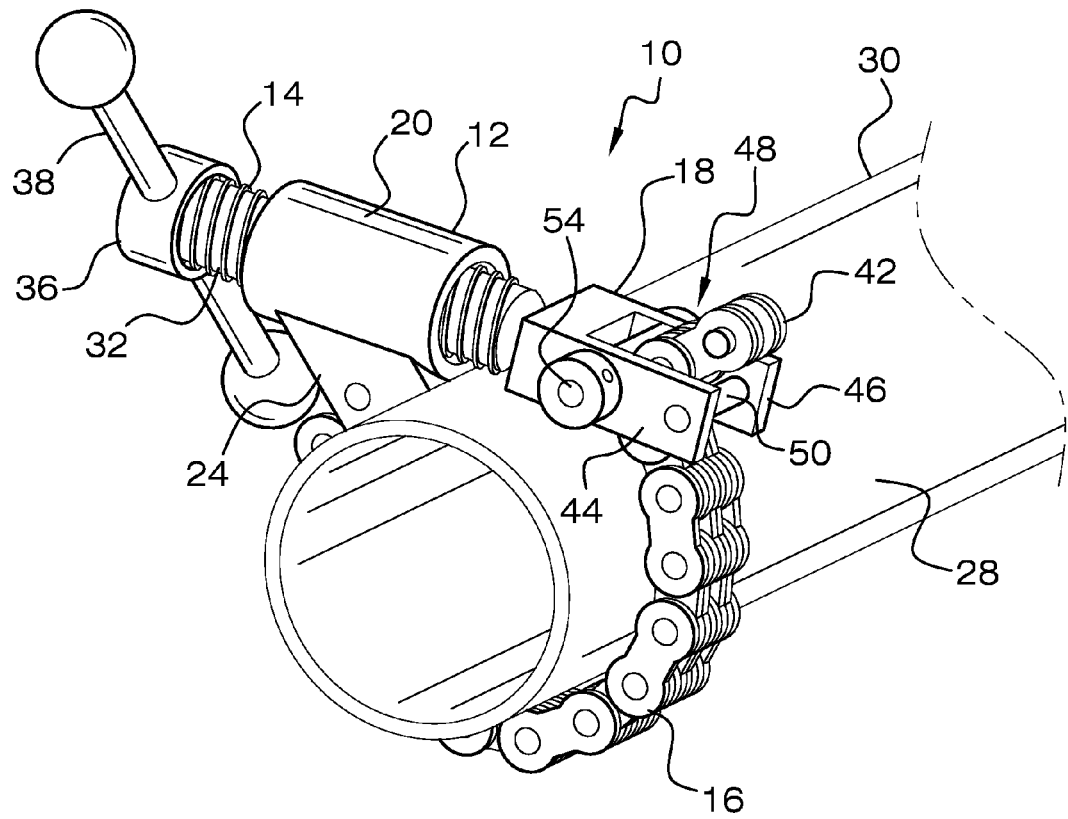
FIG. 2 is a perspective end view of a pipe section having the pipe adjustment tool attached to the pipe section.
Figure 3:
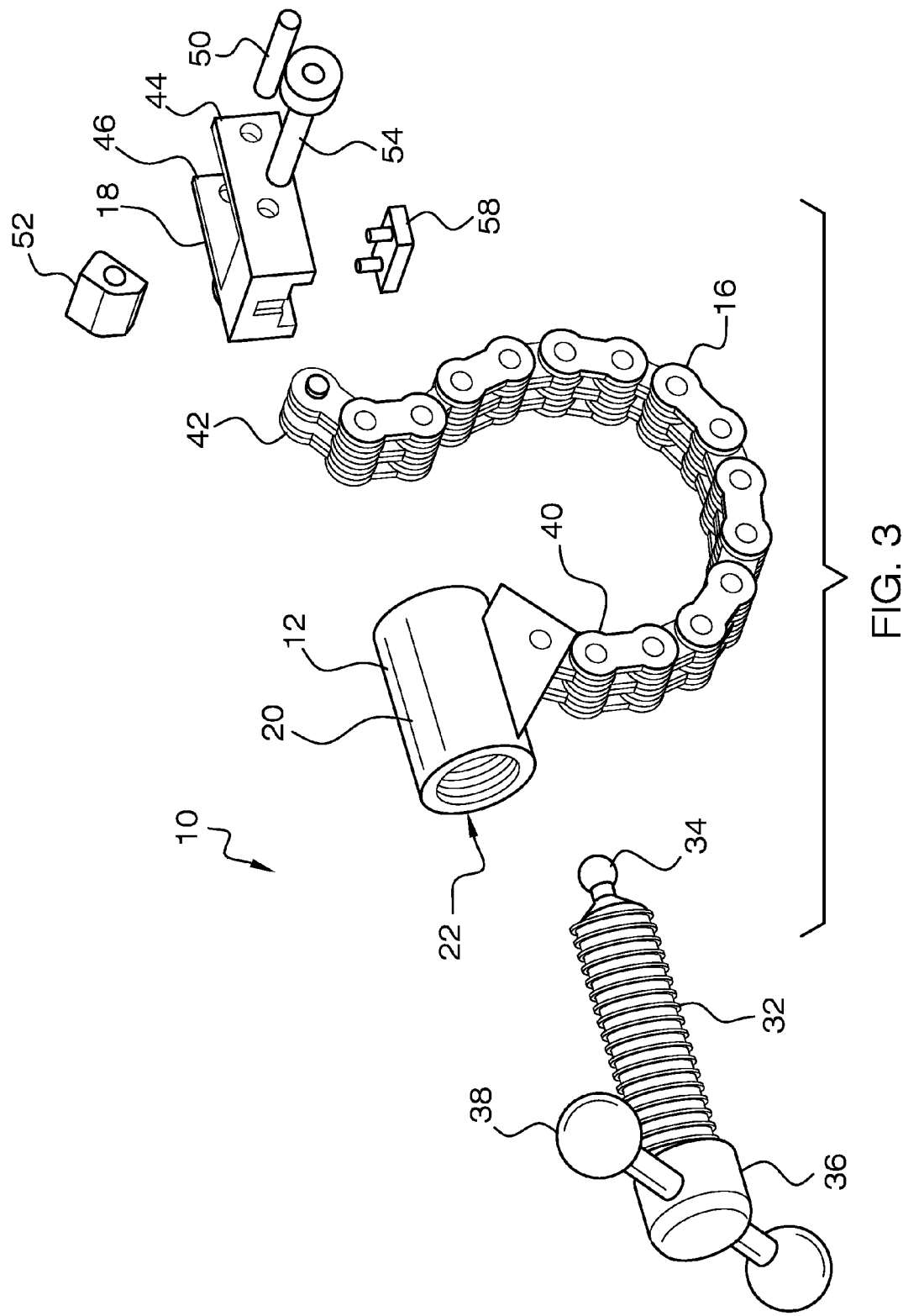
FIG. 3 is an exploded perspective assembly view of the pipe adjustment tool.
Figure 4:
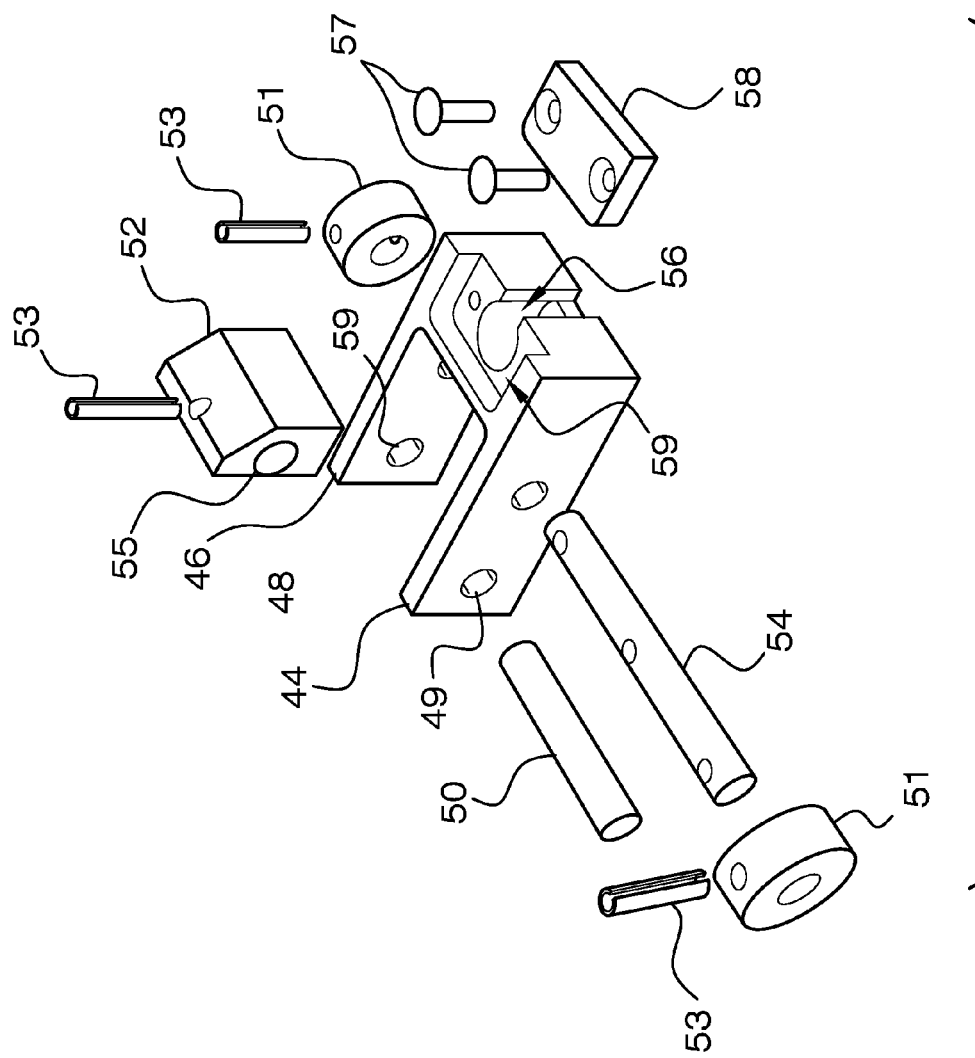
FIG. 4 is an exploded perspective assembly view of a retainer of the pipe adjustment tool.

Reference will now be made in detail to the preferred embodiments of the invention, examples of which are illustrated in the accompanying drawings. Referring now to FIGS. 1-4 of the drawings, reference numeral 10 generally designates a pipe adjustment tool in accordance with the invention for use in aligning the confronting ends of a pair of pipe sections in joining the confronting ends together.

Referring to the drawings, the pipe adjustment tool 10 includes a frame 12, a tensioner 14, a flexible clamping member or chain 16, and a retainer 18. The frame 12 includes a cylindrical shaped body 20 having a threaded bore 22 longitudinally extending completely through the body 20. The frame 12 further includes a base 24 attached to and extending radially outward from the body 20. Base 24 may be integral with body 20 or secured therewith, for example by welding.

Base 24 includes a seating surface 26 for engagement with an exterior surface 28 of a pipe section 30. The seating surface 26 is disposed at a 45-degree angle Ø to a longitudinal axis 29 of the threaded bore 22, and acts radially inward against the exterior surface 28 of the pipe section 30.

Tensioner 14 includes a threaded bolt 32 that is threadably disposed and extends through the threaded bore 22. A first end 34 of the bolt 32 is ball shaped and forms a male portion of a ball-and-socket coupling, as will be further described. The opposite end or second end 36 of the bolt 32 includes a crank 38 for operating the bolt, i.e. threading the bolt in the threaded bore 22 to tension the clamping member 16 about the pipe section 30, as will also be further described.

Clamping member 16 such as of a leaf chain includes first and second ends 40 and 42. In an aspect, leaf chain 16 may be a leaf chain with a 1-inch pitch and with 4×4 lacing. The first end 40 of chain 16 is pivotally connected the base 24 of frame 12 approximate seating surface 26. The second end 42 of the chain is free to be threaded through retainer 18 for clamping about the pipe section 30.

Retainer 18 is generally of a block construction and includes a pair of spaced furcations 44 and 46 which define an aperture 48 through which the second end 42 of the chain 16 is threadable and securable. A retaining pin 50 is disposed within the aperture 48 at an outward location and extends between the furcations 44 and 46 where opposite ends of the retaining pin are received by cooperating holes 49 formed through the furcations. Retaining pin 50 can be press-fit into through holes 49. A cam lock 52 is disposed within the aperture 48 and is supported on a cam pivot-pin 54 that is inserted through bore 55 of the cam lock. The cam pivot-pin 54 extends between furcations 44 and 46 at inwardly spaced position from the retaining pin 50 and is retained by a pair of knobs 51 attached to opposed ends of the cam pivot-pin. Knobs 51, and the cam lock 52 are fixedly secured to the cam pivot-pin 54 for conjoined rotation therewith by spring roll pins 53. The second end 42 of the chain 16 is threaded through aperture 48 between the cam lock 52 and retaining pin 50. Cam lock 52 is rotatable about cam pivot-pin 54 between a first position where the chain 16 is clamped between the cam lock 52 and the retaining pin 50, and a second position where the chain 16 is freely passable between the cam lock and the retaining pin.

The ball-shaped end 34 of the bolt 32 is received within a socket 56 in the retainer 18 at an end opposite aperture 48, and is retained therein by retaining plate 58. Retaining plate 58 is received in recessed area 59 of the retainer 18 and is secured to the retainer by screws 57. In this manner, end 34 of the bolt 32 and the retainer 18 are connected together in an articulated joint permitting retainer 18 to move freely in space about the ball-shaped end 34 of the bolt, and permitting the bolt to rotate about axis 32 relative to the retainer 18. Threading of the bolt 32 in threaded bore 22 adjusts the distance between the retainer 18 and the frame 12, i.e. threading the bolt into the threaded bore moves the retainer in a direction away from the frame, and threading the bolt from the threaded bore draws the retainer in a direction towards the frame.

To condition the pipe adjustment tool 10 for use, the cam lock 52 is rotated into position to permit the free passing of the second end 42 of the chain 16 and is freely passable between the cam lock and the retaining pin 50 during threading through aperture 48 in the retainer 18. The frame 12 is positioned with the seating surface 26 facing towards the exterior surface 28 of the pipe section 30, and then chain 16 is wrapped about the pipe section 30 and threaded through aperture 48 of the retainer 18 to form a loop L about the pipe section. Chain 16 is locked against withdrawal from aperture 48 by rotating the cam lock 52 into position to clamp the chain between the cam lock and the retaining pin 50. The loop L maintains the chain 16, the frame 12, and the retainer 18 in a loosely embracing relationship with the pipe section 30. The crank 38 is then operated to rotate the bolt 32 in such a manner to move or draw in the retainer 18 towards the frame 12. Such movement will cause contraction of the loop L and clamping of the chain 16 tightly about the pipe section 30. In conjunction with the frame 12 and the retainer 18, the chain 16 clampingly encircles substantially the circumference of the pipe section 30.

After clamping of the chain 16 tightly about the pipe section 30, an end of the pipe section is moved into confronting relation with an end of another pipe section and the two ends may be welded together using suitable welding methods.

The clamping chain 16 may conveniently be manufactured in different lengths so as to enable a pipefitter to align pipes of vastly differing diameters. In each instance the same frame 12, retainer 18 and tensioner 14 may be used, thereby obviating the need for multiple loop forming devices and adjustment means where pipes of differing diameters need to be fitted for welding.

To remove the pipe adjustment tool 10 from the pipe section 30, it is necessary only to reverse the procedure described above in applying the clamp to the pipes.

Figure 5:
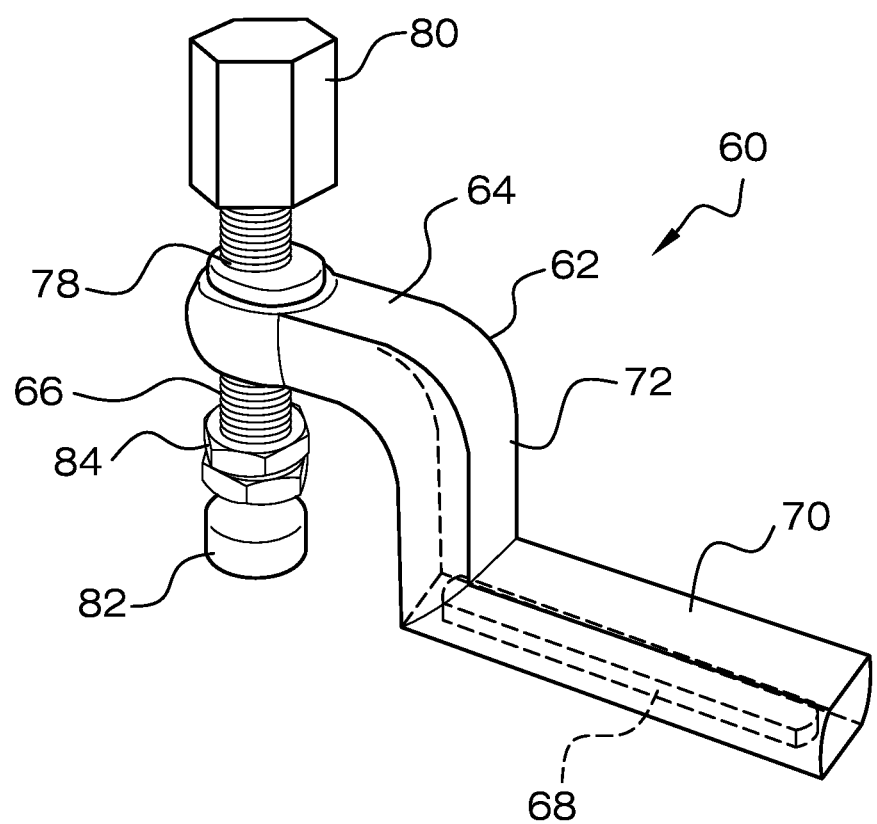
FIG. 5 is a perspective view illustrating a magnetic alignment device for use in connection with the pipe adjustment tool.
Figure 6:
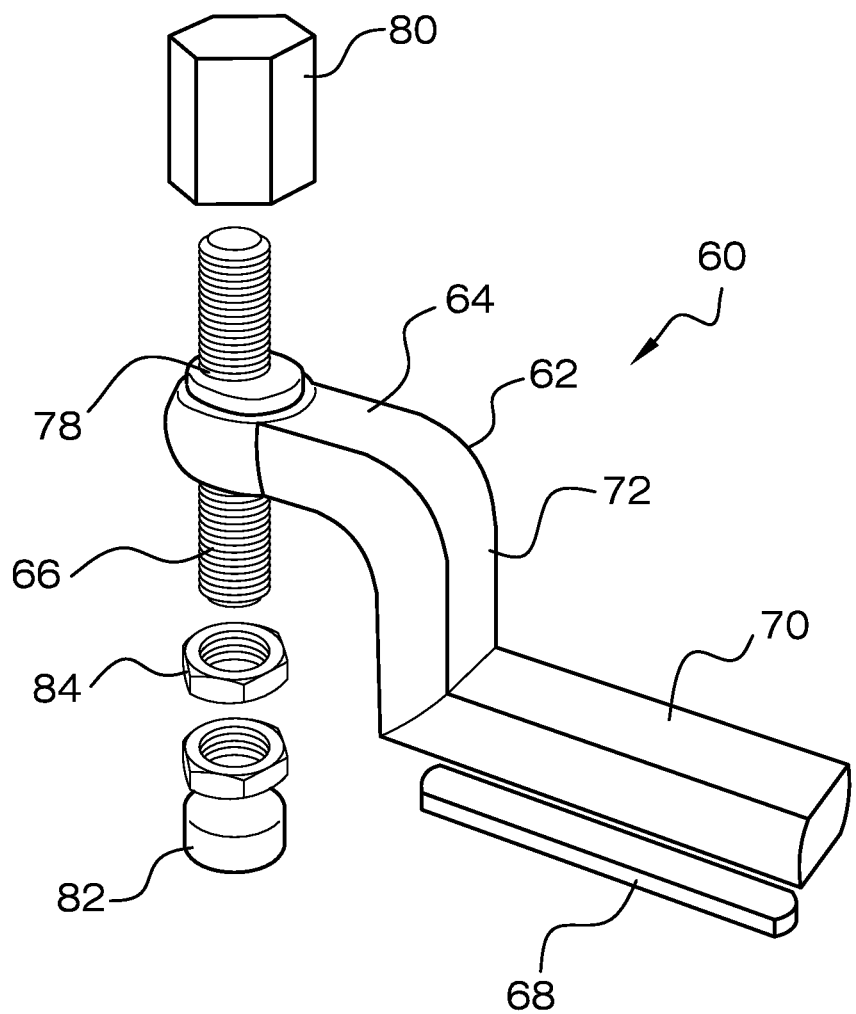
FIG. 6 is an exploded perspective view of the magnetic alignment device.

The present invention also provides magnetic alignment devices generally indicated by reference 60 and shown in FIGS. 5 and 6. Devices 60 can also be termed pipe dogs or pipe jacks and are used in the alignment of a confronting ends of two pipe sections, as will further become apparent below. Each of the devices 60 comprises an elongated metal member 62 projecting laterally and a force applying means 61. The magnetic device further comprises a magnetic member 68. The elongated metal member comprises a first planar section 70 terminating in a second planar section 72 perpendicular to planar section 70 and a third planar section 64 which lies in a plane with the first planar section 70. Planar section 70 comprises a magnetic member 68 for releasable magnetic attachment of the magnetic alignment device to the pipe section 30. The planar section 64 defines a threaded aperture 78, through which a threaded bolt 66 of the force applying means extends in axial direction. A hex shaped cap nut 80 is threadably affixed at one end of the threaded bolt 66, a swivel leveling pad 82 is threadably affixed at the opposite end of the threaded bolt. A jam nut 84 is included to prevent the swivel leveling pad 82 from inadvertently unthreading from the threaded bolt 66. The threaded bolt 66 may be rotated so as to cause the bolt to axially extend and apply axial force against the pipe section 31.

Figure 7:
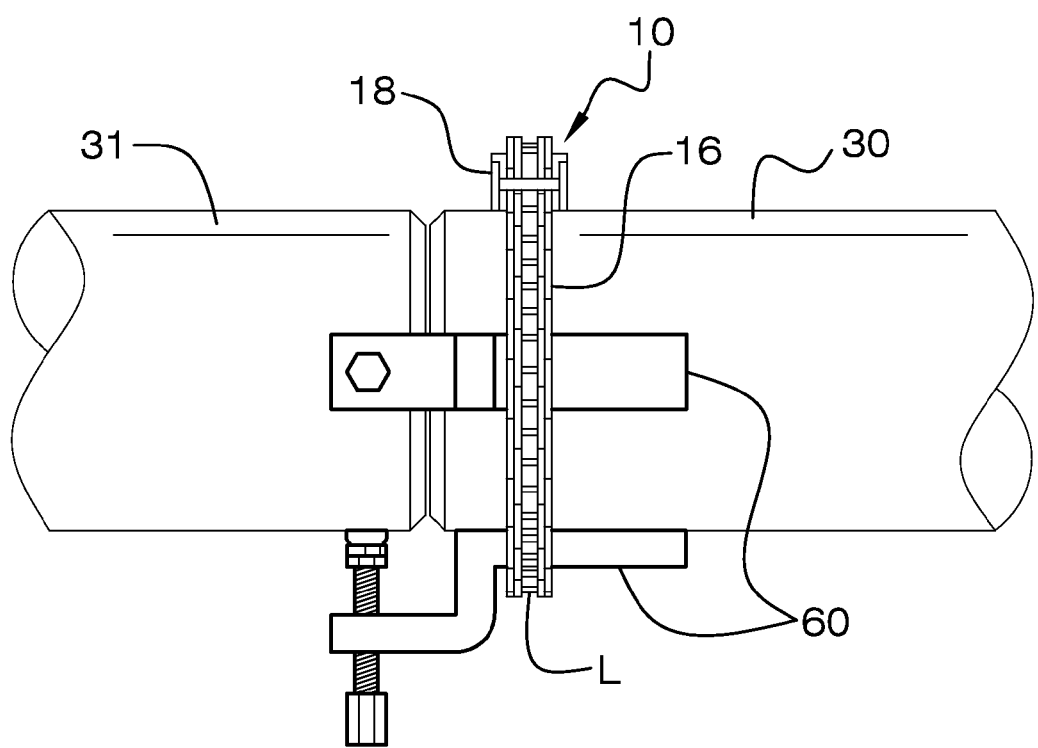
FIG. 7 is a side elevation view illustrating the combined use of the magnetic alignment device and the of the pipe adjustment tool.

In accordance with the present invention, it is also possible to use the magnetic devices in conjunction with the pipe adjustment tool 10 as generally shown in FIG. 7. To use the devices in conjunction, one or more of the magnetic alignment devices 60 are first positioned on the first pipe section 30, and the pipe adjustment tool 10 is then installed as previously described, with the loop L, however, encircling the portion of the magnetic device magnetically attached to the pipe section 30. Following clamping of the chain 16 tightly about the pipe section 30, pipe section 31 is moved into confronting relation with pipe section 30 and the force applying means 61 of the magnetic device 60 is manipulated so that they engage pipe section 31 until the two pipe members are substantially coaxial or the difference between the two pipes are minimized. If desirable, the force applying means 61 may be adjusted radially relative to the pipe members so as to reform the configuration of the confronting end of the pipe section 31.

Following positioning of the pipe members and reshaping as desired, the two pipe members may be welded together by conventional welding means.

A number of embodiments of the present invention have been described. Nevertheless, it will be understood that various modifications may be made without departing from the spirit and scope of the invention. Accordingly, other embodiments are within the scope of the following claims.

What is claimed is:

1. A pipe adjustment tool comprising:
   a flexible chain clampingly positioned about a pipe section;
   a frame comprising a cylindrical body, a threaded bore extending longitudinally and completely through said cylindrical body, and a base integral with and rigidly affixed to said cylindrical body and extending radially outward from said cylindrical body, said base having a seating surface seated against an exterior surface of the pipe section, said seating surface being disposed at a 45-degree angle relative to a longitudinal axis of said threaded bore, a first end of said flexible chain secured to said base;
   a retainer having a pair of spaced furcations defining an aperture;
   a retaining pin extending across said aperture of said retainer;
   a cam lock disposed within said aperture of said retainer at a spaced distance from said retaining pin through which a second end of said flexible chain is threaded and secured against being withdrawn from said aperture by said cam lock, said cam lock pivotally connected to said retainer for rotation between a first position where said second end of said flexible chain is compressed between said retaining pin and said cam lock, and a second position where said second end of said flexible chain is freely passable between said cam lock and said retaining pin; and
   a threaded bolt threadingly received entirely through said threaded bore and engaged with said retainer such that rotation of said threaded bolt draws said frame and said retainer together, thereby tightening said flexible chain about the pipe section.

2. The pipe adjustment tool of claim 1, wherein:
   said threaded bolt and said retainer are rotatably engaged by a ball-shaped end of said threaded bolt captured in a ball-shaped socket of said retainer.

3. The pipe adjustment tool of claim 1, further comprising:
   a handle connected to a second end of said threaded bolt for grasping by a user to thread said bolt in said threaded bore.

4. The pipe adjustment tool of claim 1, further comprising:
   a cam pivot-pin extending between said furcations upon which said cam lock is fixedly attached for conjoined rotation; and
   a pair of knobs, one fixedly secured to opposite ends of said cam pivot-pin for conjoined rotation.

* * * * *